Dec. 25, 1956     A. M. STRASS     2,775,423

INSTRUMENT LEVEL

Filed Nov. 13, 1953

Albert M. Strass
INVENTOR.

BY *[signatures]*
Attorneys

United States Patent Office 2,775,423
Patented Dec. 25, 1956

2,775,423

INSTRUMENT LEVEL

Albert M. Strass, Wisconsin Rapids, Wis.

Application November 13, 1953, Serial No. 391,947

1 Claim. (Cl. 248—180)

This invention relates in general to improvements in attachments for tripods, and more particularly to a level attachment for tripods.

The primary object of this invention is to provide an instrument level attachment for tripods which may be utilized in combination with tripods of the fixed top-type for leveling an instrument, such as a camera or the like, carried by such tripod so that the instrument may be level in respect to the levelness of the tripod.

Another object of this invention is to provide an improved level attachment for tripods which is so constructed whereby the same may be quickly and easily moved to a level position.

Another object of this invention is to provide an improved level attachment for supporting instruments level on a tripod head, the level attachment being relatively simple in construction and formed of readily obtainable materials so as to be economically feasible.

A further object of this invention is to provide an improved instrument level which includes means for attachment to a tripod head and which also is provided with means for receiving an instrument, the level attachment being of such a nature whereby the instrument attaching means may be selectively level through a minimum of manipulation and retained in such level position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
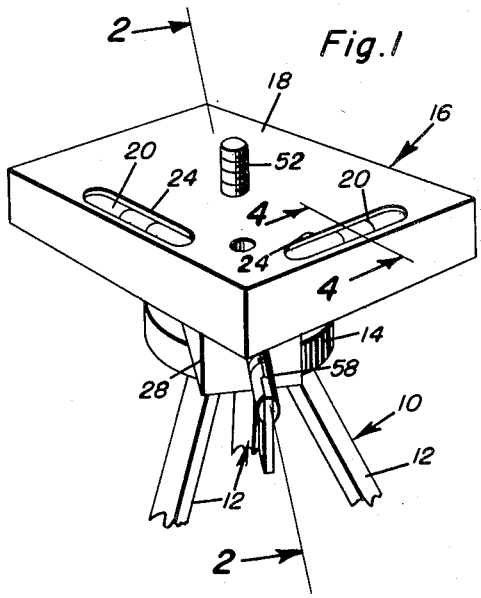
Figure 1 is a fragmentary perspective view of the upper end of a tripod and shows mounted thereon the instrument level attachment which is the subject of this invention.
Figure 4:
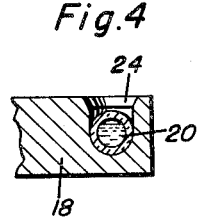
Figure 4 is an enlarged fragmentary vertical sectional view taken substantially upon the plane indicated by the section line 4—4 of Figure 1 and shows the manner in which a bubble tube forming one of the level elements is mounted.
Figure 2:
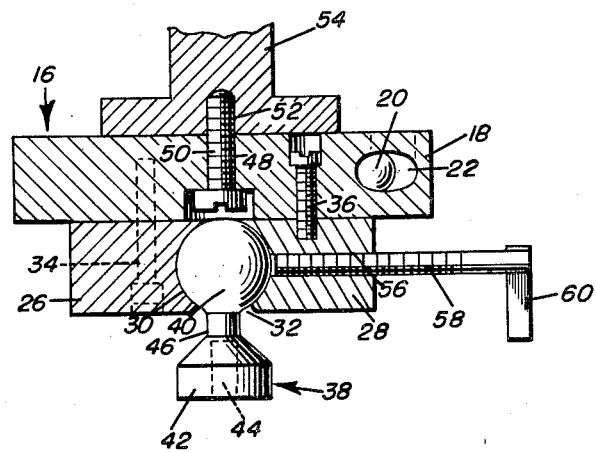
Figure 2 is an enlarged fragmentary vertical sectional view taken substantially upon the plane indicated by the section line 2—2 of Figure 1 and shows the general construction of the level attachment, the tripod being omitted and there being illustrated mounted on the level attachment, a base of an instrument.
Figure 3:
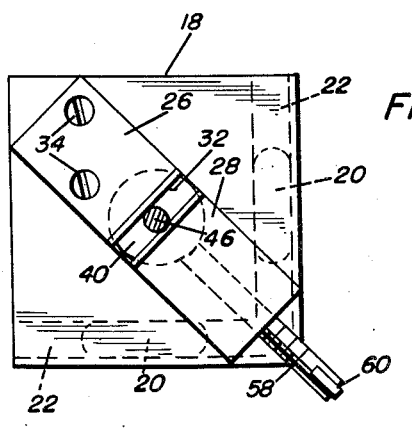
Figure 3 is a bottom plan view of the level attachment of Figure 1, a tripod attaching fitting being shown in section.

Referring now to the drawings in detail, it will be seen that there is illustrated in Figure 1 a tripod which is referred to in general by the reference numeral 10. The tripod 10 includes a plurality of depending legs 12 which have their upper ends pivotally connected to the underside of a tripod head 14. Rigidly carried by the tripod head 14 is an outwardly projecting threaded fastener (not shown) for normally receiving an instrument, such as a camera or the like. Carried by the fastener of the tripod head 14 is the instrument level attachment which is the subject of this invention, the instrument level attachment being referred to in general by the reference numeral 16.

The instrument level attachment 16 includes an uppermost plate 18 which is square in outline and which has mounted therein a pair of bubble tubes forming level elements 20. The level elements 20 are disposed in horizontal bores 22 formed in the plate 18 and project upwardly through openings 24 formed in the top wall thereof. It will be noted that the level elements 20 are disposed at right angles to each other along adjacent side edges of the plate 18.

Carried by the underside of the plate 18 is a pair of blocks 26 and 28, which are longitudinally aligned, the blocks 26 and 28 being disposed diagonally of the plate 18. It will also be noted that the longitudinal axes of the blocks 26 and 28 substantially intersect the longitudinal axes of the level elements 20 at their point of intersection. The blocks 26 and 28 have complemental opposed ends which combine to form a spherical socket 30. The spherical socket 30 opens downwardly through an elongated slot 32 which extends transversely of the longitudinal axes of the blocks 26 and 28.

It will be noted that the block 26 is rigidly secured to the underside of the plate 18 by a pair of fasteners 34 which are disposed in spaced parallel alignment with one side edge of the plate 18. The fasteners 34 extend upwardly through the block 26 into the plate 18. The block 28 is removably secured to the underside of the plate 18 by a single fastener 36 which is countersunk in the plate 18 and which passes downwardly therethrough into the upper part of the block 28.

The instrument level attachment 16 also includes a tripod attaching fitting which is referred to in general by the reference numeral 38. The tripod attaching fitting 38 including a ball 40 which is disposed at its upper end. The tripod attaching fitting 38 also includes a base 42 which has extending vertically therethrough an internally threaded bore 44. The bore 44 is of a size to receive the fastener (not shown) carried by the tripod head 14. Connecting the ball 40 to the base 42 is a reduced cross-sectional neck portion 46.

Countersunk in the plate and extending upwardly through a bore 48 therein is a fastener 50 which forms an instrument mounting fitting. The fastener 50 is removably received in an internally threaded bore 52 which opens downwardly from the underside of an instrument 54. The particular nature of the instrument 54 is immaterial and no attempt is made to further describe the instrument 54. In order that the plate 18 may be locked in an adjusted position relative to the tripod head 14, the block 28 is provided with an internally threaded bore 56. The bore 56 extends longitudinally of the block 28 and opens both through one end thereof and the socket 30. Threadedly engaged in the internally threaded bore 56 are locking means for the ball and socket connection in the form of an elongated threaded fastener 58. The threaded fastener 58 is provided at its outer end with a handle 60 for selectively turning the same. It will be seen that the inner end of the fastener 58 passes into the socket 30 and clampingly engages the ball 40 to prevent shifting of the plate 18 relative to the fitting 38.

When it is desired to level the instrument 54, the fastener 58 is merely loosened and the plate 18 shifted to a position whereby the bubbles of the tube level elements 20 are centered. Then the fastener 58 is moved to its ball clamping position. Thus it will be seen that in extremely simple operation, the plate 18 of the level attachment 16 may be quickly and easily leveled. The plate 18 being leveled, the instrument 54 carried thereby will also be level.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A level attachment for tripods comprising an instrument mounting plate, a centrally located fastener extending up through said instrument mounting plate and projecting thereabove for engagement with an instrument, a recess in the underside of said mounting plate, said fastener having a head seated in said recess, leveling means carried by said instrument mounting plate for facilitating the leveling of said instrument mounting plate, a pair of spaced opposed mounting blocks removably secured to the underside of said instrument mounting plate in face to face relation with said mounting plate, said mounting blocks having opposed surfaces forming a ball receiving socket, a ball fitting seated in said socket and being retained therein by said mounting blocks, said ball fitting having means for attachment to a tripod, said ball fitting directly underlying said fastener and preventing access to said head, another fastener adjustably carried by one of said mounting blocks clampingly engaging said ball fitting.

References Cited in the file of this patent

UNITED STATES PATENTS

| | | |
|---|---|---|
| 2,168,988 | Hultquist | Aug. 8, 1939 |
| 2,296,674 | Ingels | Sept. 22, 1942 |

FOREIGN PATENTS

| | | |
|---|---|---|
| 181 | Great Britain | Jan. 5, 1892 |
| 451,234 | Great Britain | July 31, 1936 |